(12) United States Patent
Jang et al.

(10) Patent No.: US 12,228,303 B2
(45) Date of Patent: Feb. 18, 2025

(54) HVAC SYSTEM USING INTERCONNECTED NEURAL NETWORKS AND ONLINE LEARNING AND OPERATION METHOD THEREOF

(71) Applicant: POSTECH RESEARCH AND BUSINESS DEVELOPMENT FOUNDATION, Pohang-si (KR)

(72) Inventors: Ye Eun Jang, Pohang-si (KR); Young Jin Kim, Pohang-si (KR)

(73) Assignee: POSTECH RESEARCH AND BUSINESS DEVELOPMENT FOUNDATION, Pohang-si (KR)

(*) Notice: Subject to any disclaimer, the term of this patent is extended or adjusted under 35 U.S.C. 154(b) by 417 days.

(21) Appl. No.: 17/566,587

(22) Filed: Dec. 30, 2021

(65) Prior Publication Data
US 2022/0268479 A1 Aug. 25, 2022

(30) Foreign Application Priority Data
Feb. 22, 2021 (KR) ........................ 10-2021-0023592

(51) Int. Cl.
| | |
|---|---|
| *F24F 11/64* | (2018.01) |
| *F24F 11/47* | (2018.01) |
| *G05B 13/02* | (2006.01) |
| *G06N 3/08* | (2023.01) |
| *F24F 110/12* | (2018.01) |
| *F24F 110/32* | (2018.01) |
| *F24F 130/20* | (2018.01) |

(Continued)

(52) U.S. Cl.
CPC .............. *F24F 11/64* (2018.01); *F24F 11/47* (2018.01); *G05B 13/0265* (2013.01); *G06N 3/08* (2013.01); *F24F 2110/12* (2018.01); *F24F 2110/32* (2018.01); *F24F 2130/20* (2018.01); *F24F 2140/20* (2018.01); *F24F 2140/50* (2018.01); *F24F 2140/60* (2018.01)

(58) Field of Classification Search
CPC ........ F24F 11/64; F24F 11/47; F24F 2110/12; F24F 2110/32; F24F 2130/20; F24F 2140/20; F24F 2140/50; F24F 2140/60; F24F 2110/10; F24F 2110/20; F24F 2110/22; F24F 11/62; F24F 11/58; G05B 13/0265; G05B 13/048; G06N 3/08; G06N 3/044; G06N 3/088; G06N 3/02
See application file for complete search history.

(56) References Cited

U.S. PATENT DOCUMENTS

2017/0115650 A1* 4/2017 Holleran .................. F24F 11/63
2018/0088544 A1* 3/2018 Sawada .................. G05B 15/02
(Continued)

*Primary Examiner* — Tameem D Siddiquee
(74) *Attorney, Agent, or Firm* — Morgan, Lewis & Bockius LLP

(57) ABSTRACT

The present disclosure provides a heating, ventilation, and air conditioning (HVAC) system including interconnected artificial neural networks trained for respective subsystems that are required for building temperature control. The HVAC system includes: an air conditioning sensor units installed in or outside a building to detect environmental data; an HVAC device configured to supply thermal energy into an inner space of the building using input power; and a predictive controller configured to generate operational data based on the environmental data and control the HVAC device by adjusting the input power.

14 Claims, 7 Drawing Sheets

(51) Int. Cl.
*F24F 140/20* (2018.01)
*F24F 140/50* (2018.01)
*F24F 140/60* (2018.01)

(56) References Cited

U.S. PATENT DOCUMENTS

2019/0017721 A1* 1/2019 Motodani ................ F24F 11/64
2019/0075687 A1* 3/2019 Brunstetter .......... G05B 13/027
2019/0360711 A1* 11/2019 Sohn ...................... G05B 15/02
2021/0191343 A1* 6/2021 Lee ......................... F24F 11/30

* cited by examiner

HVAC SYSTEM USING INTERCONNECTED NEURAL NETWORKS AND ONLINE LEARNING AND OPERATION METHOD THEREOF

CROSS-REFERENCE TO RELATED APPLICATION

The present application claims a convention priority based on Korean Patent Application No. 10-2021-0023592 filed on Feb. 22, 2021, with the Korean Intellectual Property Office (KIPO), the entire content of which is incorporated herein by reference.

BACKGROUND

1. Technical Field

The present disclosure relates to a heating, ventilation, and air-conditioning (HVAC) system and, more particularly, to an HVAC system controlled by an artificial neural network based on a thermal response model of a building. Also, the present disclosure relates to an operation method of the HVAC system.

2. Related Art

It has been reported that commercial buildings accounted for more than 36% of total energy consumption in the United States in 2019. In particular, heating, ventilation, and air-conditioning (HVAC) systems represent approximately 40% of the electricity used in the commercial buildings. Accordingly, significant efforts has been given to the modeling and optimized operation of the HVAC systems to reduce electrical loads and improve an energy efficiency in the commercial buildings.

One of the conventional methods of optimizing the operation of the HVAC system is to construct a physical model based on physical parameters and mechanical and thermodynamics equations to formulate an optimization problem using the physical model and determine an optimal schedule for the air conditioning system. The physics-based modeling of the HVAC system, however, requires numerous parameters to reflect the complex nonlinear relationships among the HVAC loads, an indoor temperature, and an outdoor environment, but such parameters are unknown and need to be extracted using sophisticated estimation techniques. Moreover, types, sizes, and operating characteristics of the HVAC systems vary depending on the buildings in which the systems are installed, and the physics-based model cannot be applied universally to various buildings equipped with the HVAC systems of different types.

Therefore, there is a need for a method of modeling the HVAC system by using operation data of an existing HVAC system and the building and obtaining an optimal schedule for the HVAC system by use of a constructed model.

SUMMARY

Provided is a heating, ventilation, and air conditioning (HVAC) system including interconnected artificial neural networks trained for respective subsystems that are required for building temperature control and improving the modeling accuracy of the building thermodynamics.

Provided is an operation method of the HVAC system.

Objects of the present disclosure are not limited thereto and may be variously expanded without departing from the spirit and scope of the present disclosure.

According to an aspect of an exemplary embodiment, provided is an HVAC system including: an air conditioning sensor units installed in or outside a building to detect environmental data; an HVAC device configured to supply thermal energy into an inner space of the building using input power; and a predictive controller configured to generate operational data based on the environmental data and control the HVAC device by adjusting the input power.

The HVAC system may further include a first data storage configured to store the environmental data including a heat load ($Q_i$) of the building, an outside air temperature ($T_x$), an evaporator-side air temperature ($T_e$), and a temperature, a humidity, a wind speed, and a solar radiation outside the building.

The HVAC system may further include a second data storage configured to store operational data including a temperature setting ($T_{set}$), an input power ($P$), and an output cooling power ($Q$) of the HVAC device.

The HVAC system may further include a training predictor configured to label unlabeled environmental data and operational data and train the predictive controller using labeled environmental data and labeled operational data.

The HVAC system may further include an ANN training unit configured to periodically train the training predictor using interconnected artificial neural networks based on the environmental data stored in the first data storage and the operational data stored in the second data storage.

The ANN training unit may perform operations of predicting indoor temperatures of the building by using an integrated model to generate predictive operational data. The integrated model may include: a first sub-model configured to receive a temperature set point, an indoor temperature of a previous time, and an input power of the HVAC device of the previous time to calculate a next input power of the HVAC device; a second sub-model configured to receive input power of the HVAC device, an ambient temperature, and an evaporator-side air temperature to calculate an output cooling power of the HVAC device; and a third sub-model configured to receive the output cooling power of the HVAC device, atmospheric environment variables, and the indoor temperature of the previous time to calculate an indoor temperature of the building.

Each of the first through the third sub-models of the integrated model may include a LSTM network.

The HVAC system may further include a preprocessor configured to normalize the environmental data from the first data storage and the operational data from the second data storage; and a postprocessor configured to reconstruct the operational data generated by the integrated model.

The HVAC system may further include a dissatisfaction calculator configured to calculate a thermal dissatisfaction of a user and an operation cost calculator configured to calculate an operation cost.

According to an aspect of an exemplary embodiment, provided is a method of operating an HVAC system comprising an HVAC device controlling humidity, ventilation, and air-conditioning of a building. The method includes: training an interconnected artificial neural network model for a data-based modeling of an HVAC device comprising a plurality of sub-models by use of initial operational data of the HVAC device; operating the HVAC device according to an optimal schedule and acquiring and storing environmental data and operational data in a first and second storage, respectively; re-training the plurality of sub-models by use of newly-collected environmental and operational data; and predicting an input power of the HVAC device and the indoor temperature of the building according to an environmental change inside and outside the building by a trained artificial neural network model, calculating an operation cost and a thermal satisfaction, and determining a new optimal schedule for operating the HVAC device.

According to an aspect of an exemplary embodiment, provided is a method of operating an HVAC system controlling humidity, ventilation, and air-conditioning of a building. The method includes: constructing a plurality of sub-models for an HVAC device based on data availability and a physical causal relationship; collecting operational data of the sub-models; training the sub-models based on the operational data, by an ANN training unit, to configure operational data-based sub-models; constructing an integrated model by interconnecting the data-based sub-models; predicting, by a predictive controller, an indoor temperature of the building using the integrated model; calculating, by a dissatisfaction calculator, thermal dissatisfaction (discomfort) based on a predicted indoor temperature; calculating, by an operation cost calculator, an operation cost based on a predicted input power provided by the integrated model; controlling the HVAC device based on an objective function obtained using the thermal dissatisfaction and the operation cost; storing new operational data generated by the HVAC device in a second data storage; and re-training the sub-models using the new operational data along with environmental data and the operational data.

The operation of training the sub-models based on the operational data to configure operational data-based sub-models may include: calculating an input power of the HVAC device in a current prediction section by inputting, to a first sub-model, an indoor temperature of a previous prediction section and an input power of the HVAC device as a temperature set point and a feedback variable; calculating an output cooling power by inputting, to a second sub-model, an input power of the HVAC device, an atmospheric temperature, and an evaporator-side air temperature; and calculating an indoor temperature of the current prediction section by inputting, to a third sub-model, an output cooling power of the HVAC device, an atmospheric environment variable, and an indoor temperature in the previous prediction section as the feedback variable.

The thermal dissatisfaction may be calculated by adding all deviations from an acceptable range of the indoor temperature exceeding a prescribed temperature.

The objective function may be calculated by applying respective weights to the thermal dissatisfaction calculated by the dissatisfaction calculator and the operation cost calculated by the operation cost calculator.

The operation of controlling the HVAC device based on the objective function may include controlling the HVAC device such that the objective function is minimized.

The operation of predicting the indoor temperature of the building using the integrated model may include: collecting data including at least one of the external ambient temperature and a heat load of a zone in which each resident of the building is located; and modeling a temperature change in the building according to collected data.

According to exemplary embodiments of the present disclosure, the thermal energy management system of a building may be controlled through a detection of an input power and a prediction of an indoor temperature using the HVAC system using interconnected artificial neural networks and the online supervised learning. Since the input and output of the HVAC system comprised of a number of complex facilities is predicted by a plurality of artificial neural networks provided for respective major components of the HVAC system rather than by a gigantic artificial neural network, the exemplary embodiments enable to check the prediction process of each of the artificial neural networks, require less training data sets, and show higher prediction accuracies.

The model accuracy may be enhanced by periodically re-training the individual artificial neural networks through the online supervised learning.

In addition, since the indoor temperature and the input power of the HVAC system is predicted by using an integrated model in which a plurality of models trained with the operational characteristics of the HVAC system and the thermal response or thermodynamics of the building are interconnected, the prediction accuracy is high and the operation cost may be reduced while maintaining the thermal satisfaction of the occupants of the building.

BRIEF DESCRIPTION OF THE DRAWINGS

In order that the disclosure may be well understood, there will now be described various forms thereof, given by way of example, reference being made to the accompanying drawings, in which.

Figure 1:
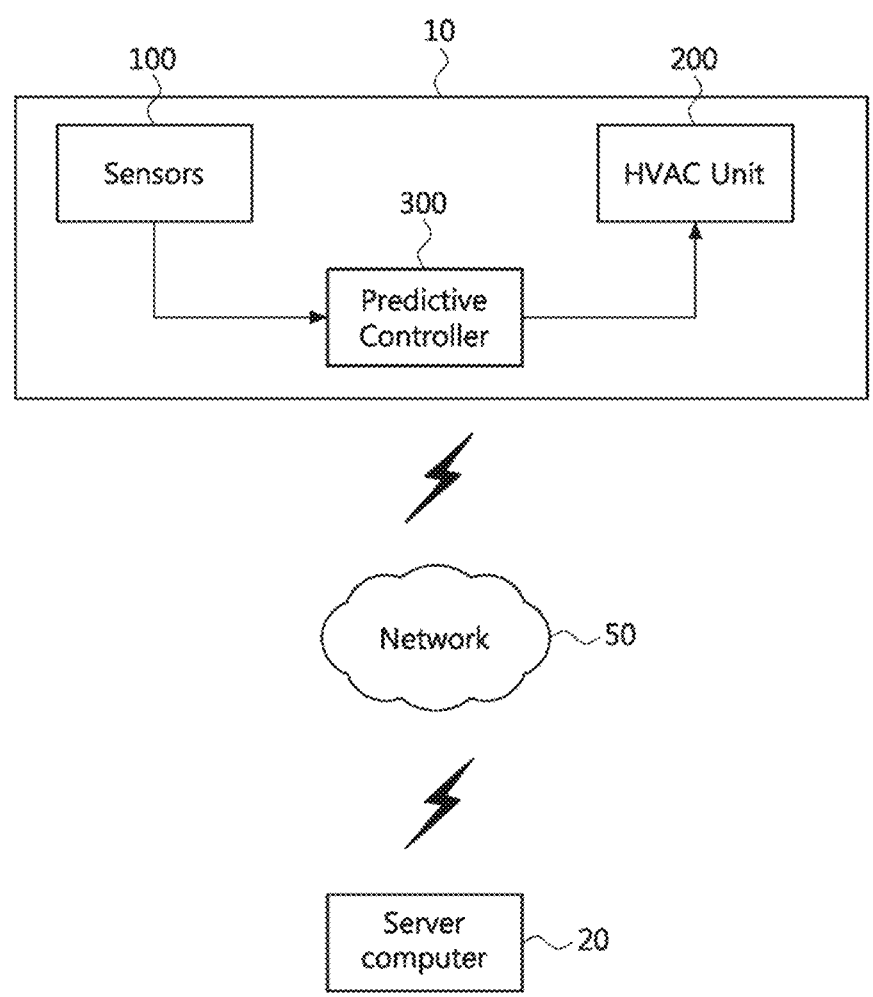
FIG. 1 illustrates a network environment of a building temperature control system according to an exemplary embodiment of the present disclosure.

The drawings described herein are for illustration purposes only and are not intended to limit the scope of the present disclosure in any way.

DETAILED DESCRIPTION

For a more clear understanding of the features and advantages of the present disclosure, exemplary embodiments of the present disclosure will be described in detail with reference to the accompanied drawings. However, it should be understood that the present disclosure is not limited to particular embodiments disclosed herein but includes all modifications, equivalents, and alternatives falling within the spirit and scope of the present disclosure. In the drawings, similar or corresponding components may be designated by the same or similar reference numerals.

The terminologies including ordinals such as "first" and "second" designated for explaining various components in this specification are used to discriminate a component from the other ones but are not intended to be limiting to a specific component. For example, a second component may be referred to as a first component and, similarly, a first component may also be referred to as a second component without departing from the scope of the present disclosure. As used herein, the term "and/or" may include a presence of one or more of the associated listed items and any and all combinations of the listed items.

When a component is referred to as being "connected" or "coupled" to another component, the component may be directly connected or coupled logically or physically to the other component or indirectly through an object therebetween. Contrarily, when a component is referred to as being "directly connected" or "directly coupled" to another component, it is to be understood that there is no intervening object between the components. Other words used to describe the relationship between elements should be interpreted in a similar fashion.

The terminologies are used herein for the purpose of describing particular exemplary embodiments only and are not intended to limit the present disclosure. The singular forms include plural referents as well unless the context clearly dictates otherwise. Also, the expressions "comprises," "includes," "constructed," "configured" are used to refer a presence of a combination of stated features, numbers, processing steps, operations, elements, or components, but are not intended to preclude a presence or addition of another feature, number, processing step, operation, element, or component.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having meanings consistent with their meanings in the context of related literatures and will not be interpreted as having ideal or excessively formal meanings unless explicitly defined in the present application.

Exemplary embodiments of the present disclosure will now be described in detail with reference to the accompanied drawings. In the following description and the drawings, similar or corresponding components may be designated by the same or similar reference numerals to facilitate an overall understanding of the present disclosure and replicate description of them will be omitted for simplicity.

System Configuration

FIG. 1 illustrates a network environment of a building temperature control system according to an exemplary embodiment of the present disclosure. The building temperature control system 10 that controls the temperature of a building may be connected to a server computer located in the building or a remote site through a network 50. The building temperature control system 10 may operate based on a plurality of artificial neural networks (ANNs) of which precision may be enhanced through the online supervised learning. The building temperature control system 10 may include multiple sensors 100, a heating, ventilation, and air-conditioning (HVAC) unit 200, and a predictive controller 300.

Figure 2:
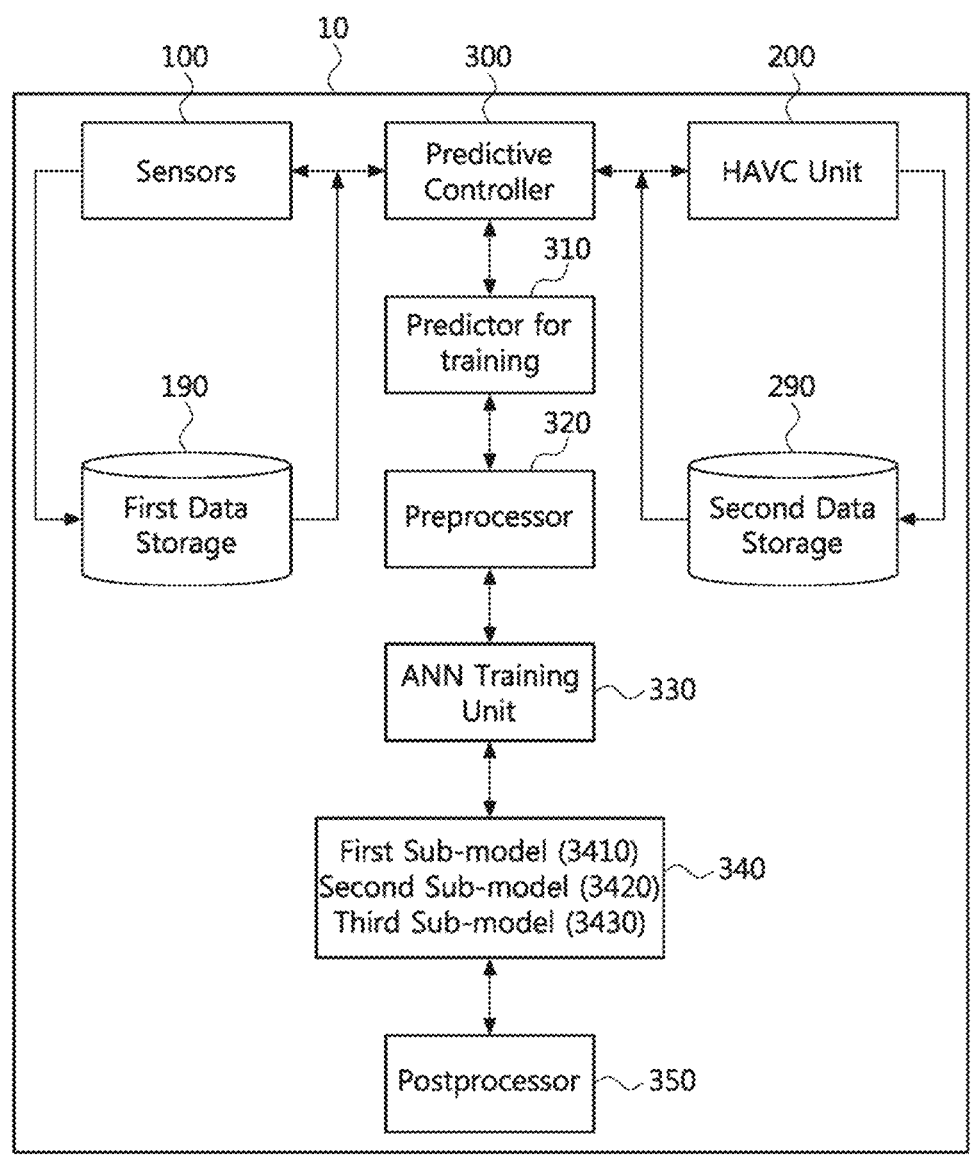
FIG. 2 is a block diagram of the building temperature control system according to an exemplary embodiment of the present disclosure.

FIG. 2 is a block diagram of the building temperature control system 10 according to an exemplary embodiment of the present disclosure. The building temperature control system 10 may include a first data storage 190 and a second data storage 290 in addition to the sensors 100, the HVAC unit 200, and the predictive controller 300. The building temperature control system 10 may further include a training predictor 310, a preprocessor 320, an artificial neural network (ANN) training unit 330, an integrated model 340, and a postprocessor 350. The training predictor 310, the preprocessor 320, the ANN training unit 330, the integrated model 340, and the postprocessor 350 may be components of the predictive controller 300 or be incorporated into the predictive controller 300 alternatively while they are provided separately from the predictive controller 300 in the drawing. Meanwhile, the integrated model 340 may include a first sub-model 3410, a second sub-model 3420, and a third sub-model 3430.

The sensors 100 may include a temperature sensor, a humidity sensor, a wind speed sensor, and a solar radiation sensor, each of which may be installed in or outside the building to detect respective environmental data. The first data storage 190 may store sensed data detected by the sensors and data calculated based on the sensed data. The data stored in the first data storage 190 may include a heat load $Q_i$ of the building, an outside air temperature $T_x$, an evaporator-side air temperature $T_e$, and a temperature, a humidity, a wind speed, and a solar radiation outside the building. The second data storage 290 may store operational data including a temperature setting $T_{set}$, an input power $P^t$, and an output cooling power $Q^t$ of each of the HVAC unit 200. The HVAC unit 200 may supply thermal energy to into the building under a control of the predictive controller 300.

The predictive controller 300 may generate operational data based on the environmental data detected by the sensors 100 and controls the temperature in the building by controlling the HVAC unit 200 to adjust the input power. The predictive controller 300 may include at least one processor executing instructions to perform the control operations and a memory storing the instructions.

The training predictor 310 may have a same configuration as the predictive controller 300. The training predictor 310 may label unlabeled environmental data and operational data using the predictive controller 300 trained with labeled environmental data and operational data, and may train the predictive controller 300 using the labeled environmental data and operational data. The preprocessor 320 may normalize the environmental data received from the first data storage 190 and the operational data received from the second data storage 290. The ANN training unit 330 may include interconnected artificial neural networks, and may train the training predictor 310 periodically using the interconnected artificial neural networks based on big data, that is, the environmental data stored in the first data storage 190 and the operational data stored in the second data storage 290.

The integrated model 340 may perform operations for predicting indoor temperatures of the building to generate predictive operational data. The integrated model 340 may include the first through the third sub-models 3410-3430. The first through the third sub-models 3410-3430 may include Long Short-Term Memory (LSTM) recurrent neural networks. The first sub-model 3410 may receive a temperature set point, an indoor temperature of the previous time, and the input power of the HVAC unit 200 of the previous time and calculate a next input power of the HVAC unit 200. The second sub-model 3420 may receive the input power of the HVAC unit 200, an ambient temperature, and the evaporator-side air temperature and calculate an output cooling power of the HVAC unit 200. The third sub-model 3430 may receive the output cooling power of the HVAC unit 200, atmospheric environment variables, and the indoor temperature of the previous time and calculate an indoor temperature of the building. The postprocessor 350 may reconstruct the operational data generated by the integrated model 340.

Figure 3:
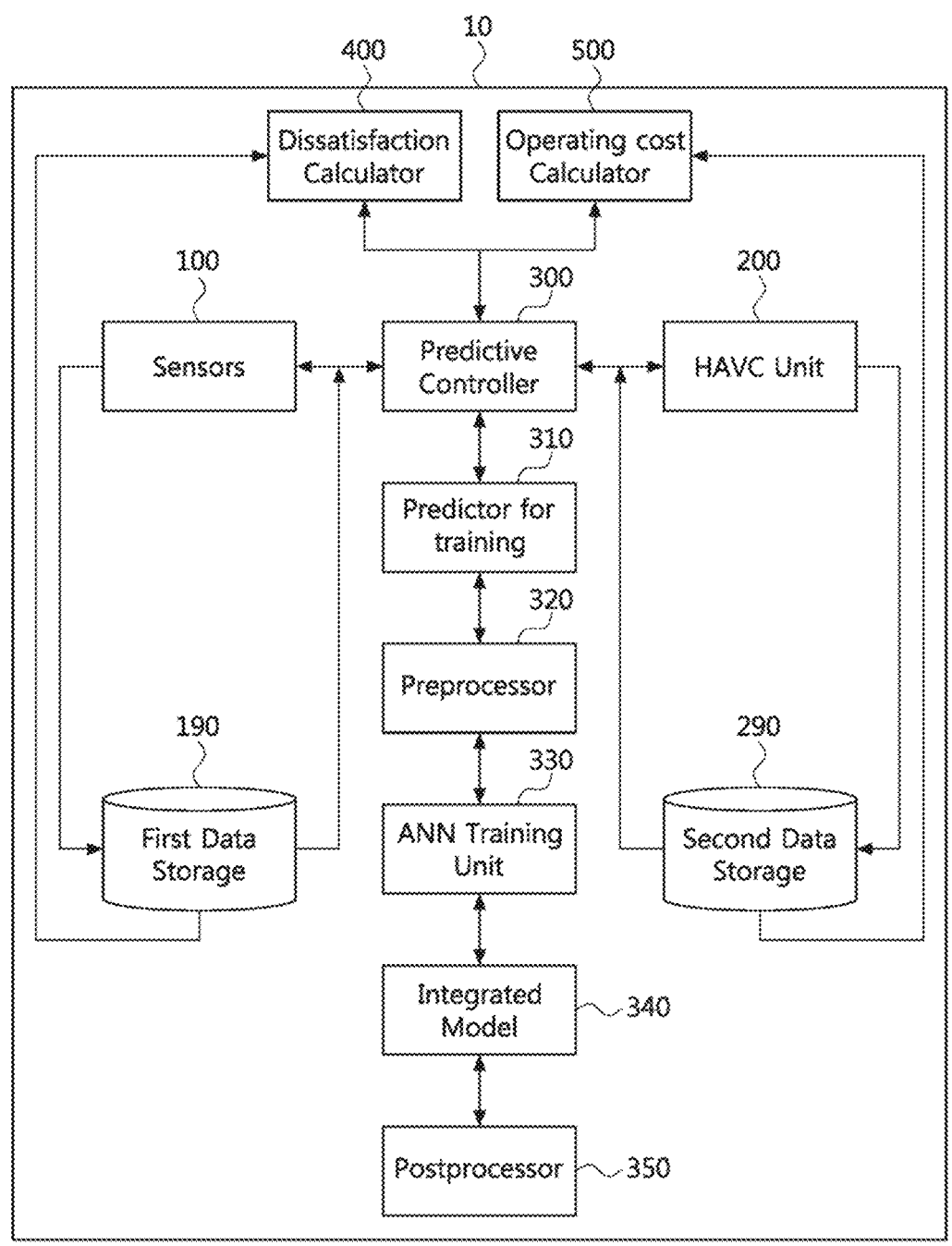
FIG. 3 is a block diagram of the building temperature control system according to another exemplary embodiment of the present disclosure.

FIG. 3 is a block diagram of the building temperature control system 10 according to another exemplary embodiment of the present disclosure. According to the present embodiment, the building temperature control system 10 may further include a dissatisfaction calculator 400 and an operation cost calculator 500.

The dissatisfaction calculator 400 may calculate a thermal dissatisfaction of a user. The operation cost calculator 500 may calculate an operation cost for the building temperature control system 10. An objective function may be calculated based on the thermal dissatisfaction calculated by the dissatisfaction calculator 400 and the operation cost calculated by the operation cost calculator 500 by applying respective weights to them. The predictive controller 300 may control the HVAC unit 200 based on the objective function calculated from the thermal dissatisfaction and the operation cost for the building temperature control system 10. For example, the predictive controller 300 may control the HVAC unit 200 such that the objective function is minimized.

ANN-Based Modeling of Subsystems

Figure 4:
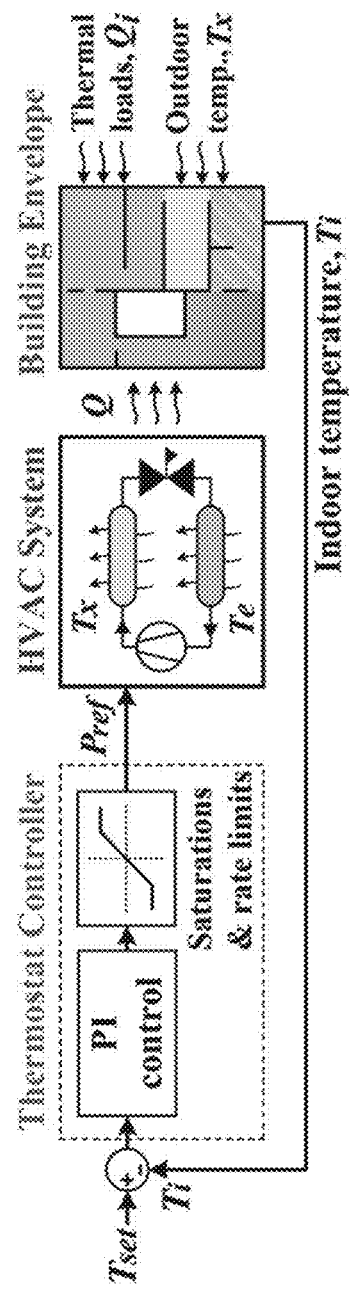
FIG. 4 is a schematic diagram of the building temperature control system according to an exemplary embodiment of the present disclosure.

FIG. 4 is a schematic diagram of the building temperature control system 10 according to an exemplary embodiment of the present disclosure. The building temperature control system 10, which is suitable for controlling indoor temperature of a commercial building, may include a thermostat-control loop, an HVAC unit, and a building envelope. Specifically, in the thermostat control loop may include a proportional-integral (PI) controller adopted to adjust a reference input power $P_{ref}^t$ of the HVAC unit based on a difference between the set point $T_{set}^t$ and an actual value $T_i^t$ of the indoor temperature. In practice, the PI controller may be accompanied by a nonlinear signal processing functional block such as a saturator and ramp rate limiter to ensure a reliable system operation. The HVAC unit may receive the reference power $P_{ref}^t$ as an input signal and provide thermal energy $Q^t$ to the building envelope when the ambient temperature $T_x^t$ and the evaporator-side air or water temperature $T_e^t$ are given. The HVAC unit may be implemented by a variable speed heat pump, for example. The time response of the variable speed drive is fast and, consequently, the actual input power $P^t$ is almost the same as the reference power $P_{ref}^t$ (i.e., $P^t \approx P_{ref}^t$) particularly in a scheduling time horizon. The profile of the actual indoor temperature value $T_i^t$ in the building envelope may be determined by the HVAC system operation (i.e. the thermal energy $Q^t$) and the building thermal environments $E^t$ such as the ambient temperature $T_x^t$, the evaporator-side air or water temperature $T_e^t$, and an indoor thermal load $Q_i^t$.

The predictive controller 300 of the building temperature control system 10 according to an exemplary embodiment of the present disclosure may control the indoor temperature by changing a command value $P_{ref}$ of the input power of the HVAC unit such that the difference between the indoor temperature $T_i$ and the target temperature $T_{set}$ is reduced.

Figure 5:
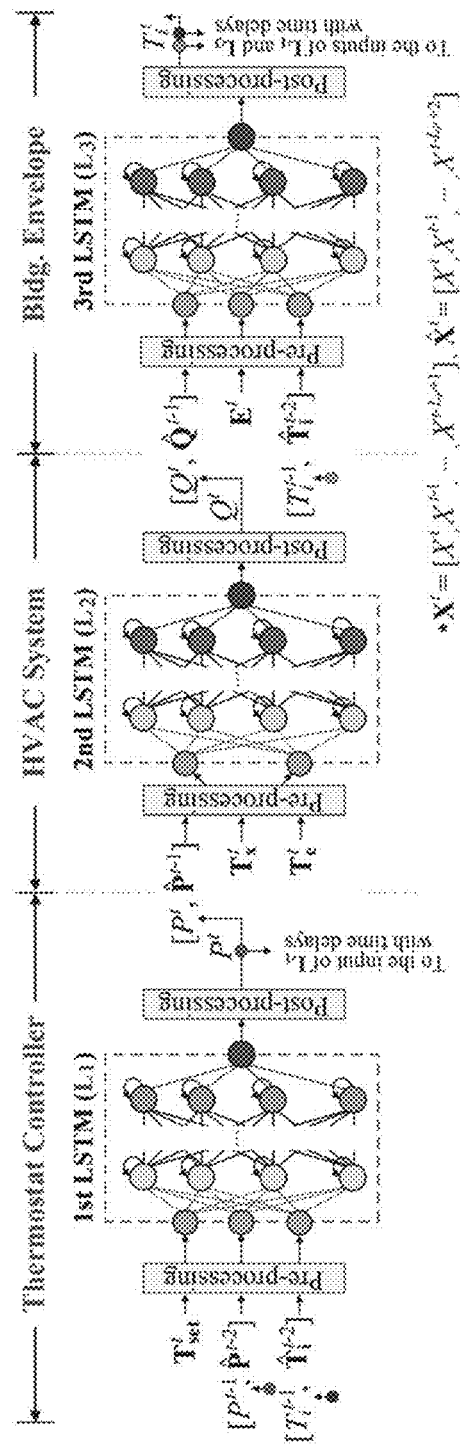
FIG. 5 is a schematic diagram of an artificial neural network according to an exemplary embodiment of the present disclosure, in which LSTM networks corresponding to sub-models of a thermostat controller, an HVAC unit, and a building envelope are interconnected.

FIG. 5 is a schematic diagram of an artificial neural network according to an exemplary embodiment of the present disclosure. The HVAC system shown in the drawing include three subsystems, i.e., a thermostat controller, an HVAC unit, and a building envelope. Each subsystem may be modeled using an ANN. Thus, the heating and air conditioning model includes three sub-ANN models corresponding to respective subsystems. The three sub-ANN models are interconnected to construct the overall heating and air conditioning model for the HVAC system. Each sub-ANN model may be composed of a preprocessor, an input layer, a hidden layer, an output layer, and a postprocessor.

An adequacy of each sub-ANN model may be evaluated by measuring and analyzing output of the sub-ANN model while adjusting a variable input to the sub-model and maintaining other conditions. The higher the adequacy of the sub-ANN model, the less over-fitting occurs, which may result in a higher accuracy.

The operating characteristics of each subsystem can successfully be reflected into an ANN with a rather simple architecture. This mitigates the overall complexity of the ANN model that represents the complete system for the building temperature control. By contrast, the conventional modeling methods often models a whole system by a single neural network. In such a case, the neural network needs be significantly complicated and deep to enough to reflect the operation of the complete system accurately, and requires a large amount of building operation data. This may reduce a modeling accuracy and the temperature control performance for a practical case with data of limited size and variability.

ANN Architecture and Training

For the subsystems, the ANN may be implemented in the form of the Long short-term memory (LSTM) network which is widely used for time-series data learning and system identification. The HVAC system according to an exemplary embodiment may readily be implemented using one or more types of ANNs.

Specifically, each of the LSTM network may include multiple hidden layers, each of which may include multiple hidden nodes with self-loops. For example, a first ANN sub-model L1 has an inner feedback loop between the output neuron for a power consumption $P^t$ and input neurons as shown in FIG. 5. A third ANN sub-model L3 has an inner feedback loop of $T_i^t$. An outer feedback loop for of $T_i^t$ also exists between an output neuron of the third ANN sub-model L3 and an input neuron of first ANN sub-model L1. Moreover, the first through the third ANN sub-models L1-L3 includes respective preprocessors and postprocessors to normalize the input data and reconstruct the output data to have their original units, preventing the training speed from dropping too low. In addition, each LSTM has a single output neuron and multiple input neurons.

The outputs of the first through the third ANN sub-models L1-L3 are defined as $P^t$, $Q^t$, and $T_i^t$, respectively. The inputs of the first ANN sub-models L1 may include a current and time-delayed values of $T_{set}^t$ and the time-delayed values of $P_t$ and $T_i^t$. The inputs of the second ANN sub-models L2 may include the current and time-delayed values of $P^t$, $T_x^t$, and $T_e^t$. The inputs of the third ANN sub-models L3 may include the current and time-delayed values of $Q^t$, and $E^t$, and the time-delayed $T_i^t$.

The time-delayed inputs of the first through the third ANN sub-models L1-L3 are reflected to achieve a better accuracy in modeling the building thermodynamics by taking into account the effects of the integral controller in the thermostat loop, the heat exchanger in the HVAC system, and the thermal energy storage inherent in the building envelope, respectively. The search range for the hyper-parameters of the first through the third ANN sub-models L1-L3 may be established by minimum and maximum values of the time delays of input neurons, the numbers of hidden layers and neurons, and the learning rates, considering a trade-off relationship between the modeling accuracy and the computational burden.

While examining all possible combinations, one may be selected that leads to good training and testing results for historical datasets. Through this procedure, the maximum time delays of the inputs of the first through the third ANN sub-models L1-L3 may be set to $L_{P1}=24$ hour (h), $L_{P2}=4$ h, and $L_{P3}=4$ h, respectively. For brevity, each LSTM has the same LP value for its input as each other, and the selected hyper-parameters of the first through the third ANN sub-models L1-L3 may be fixed during an online supervised learning.

The individual LSTMs may be trained separately using the database of a building energy management system (BEMS) database to determine weighting coefficients and biases for all the input, hidden, and output neurons. The separate training may reduce the structural complexity of the LSTMs and facilitate the modeling of the temperature control system. The feedback loops for each LSTM are also open, so that the actual time-delayed data can be fed into the input neurons and hence a supervised learning algorithm can be applied for the LSTM training. The training dataset may be obtained during the actual, normal operation of the temperature control system, ensuring the modeling convergence of the first through the third ANN sub-models L1-L3.

The optimization problem may be formulated since the physics-based modeling parameters of the HVAC system and building envelope are not required to train the LSTMs. The LSTMs may be integrated for optimal scheduling of the set-point temperatures. This enables wide application of the proposed strategy in practical BEMSs. After the training, the LSTMs are then interconnected and tested with closed feedback loops, so that the outputs estimated at the current time step can be used as the time-delayed inputs at the next step. This also enables the interconnected LSTMs to reflect the interactions among the subsystems and hence the operating characteristics of the completed system.

Figure 6:
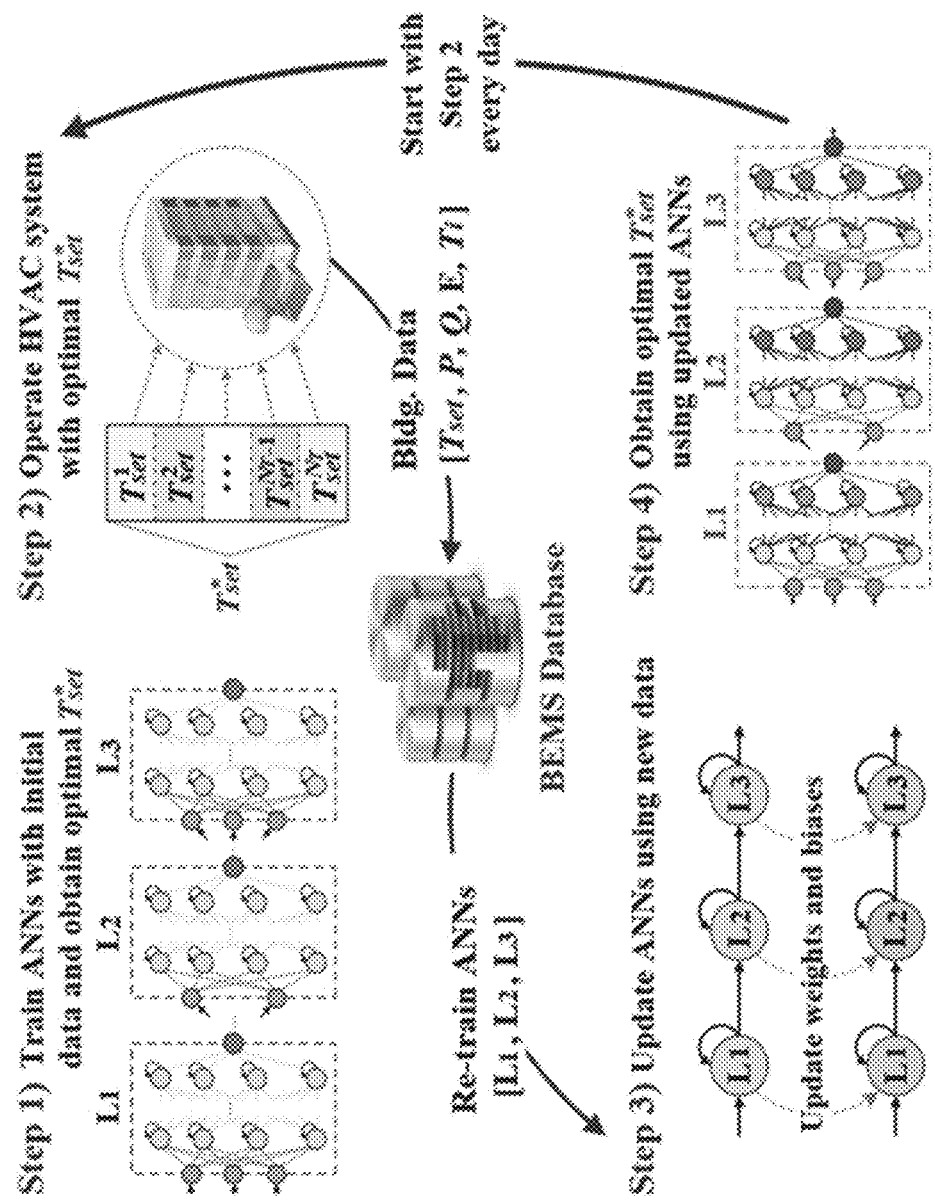
FIG. 6 is a flowchart showing a method of determining an optimal schedule for the HVAC system by performing an online supervised learning using the interconnected artificial neural networks according to an exemplary embodiment of the present disclosure.

FIG. 6 is a flowchart showing a method of determining an optimal schedule for the HVAC system by performing the online supervised learning using the interconnected artificial neural networks according to an exemplary embodiment of the present disclosure.

In step 1, the interconnected artificial neural network (ANN) models for a data-based modeling of the HVAC unit 200 may be trained using the initial operational data of the HVAC unit 200. The trained ANN models may be used to solve an optimization problem for scheduling the HVAC unit 200. A day-ahead schedule for the input ($T_{set}$) of the HVAC unit 200 may be initialized after the ANN models for the subsystems L1-L3 are trained with the initial historical data of the BEMS. At this time, the size of the initial operational data may be small and may show a low variability. Thus, the trained ANN models may be inaccurate and reveal limited performance in the optimal scheduling.

In step 2, the HVAC unit 200 may be operated according to the optimal schedule $T_{set}^*$ obtained in the step 1, and the operational dataset denoted by 'Bldg. Data' in FIG. 6 including internal and external environmental data is stored in the BEMS database. The dataset stored at this time may include the input $T_{set}$, the input power $P^t$, and output cooling power $Q^t$ of the HVAC unit 200, the internal and external environment data $E_t$, and the indoor temperature $T_i$ for a time period ($1 \leq t \leq NT$). The internal and external environmental data may include a heat load $Q_i$ in the building, the ambient temperature $T_x$, the evaporator-side air temperature $T_e$, and the like. In other words, the dataset that may be used to predict the external environment including the temperature, the humidity, the wind speed, the solar radiation may be collected and stored in the BEMS database in the step 2. A prediction of an hourly-varying retail electricity price may be collected and stored additionally. The profiles of the dataset may differ from those of the historical BEMS datasets stored before the optimal scheduling is initiated. This increases the variability in the training data, improving the accuracy of the ANN models for the subsystems L1-L3 when they are re-trained using the newly collected dataset.

In step 3, the previously-trained ANN models for the subsystems are re-trained using the historical and online datasets for a number of epochs. In other words, re-training is conducted using the newly-collected operational data and the newly-collected environmental data as well as the previously-stored operational data and the previously-stored environmental data. The re-training may stop when the modeling accuracy at the current epoch is marginally improved compared to that at previous epochs. As a result, the ANN models for the subsystems are updated including updated weights and biases. In this case, a gradient descent algorithm may be applied to data stored in the database to determine information such as relations between neurons and biases required to implement the ANNs.

In step 4, the input power of the HVAC unit 200 and the indoor temperature of the building according to an environmental change inside and outside the building may be predicted by the trained ANN models for the subsystems similarly to the step 1. In addition, a new schedule $T_{set}^*$ for optimally operating the HVAC unit 200 may be determined taking into account the operation cost and the thermal satisfaction. At this time, the operation cost may be calculated using a forecast value of the retail electricity price of a next day. The HVAC unit 200 may be operated according to the schedule $T_{set}^*$ determined in the step 4.

The steps 2 through 4 may be performed repetitively on each scheduling day during the period to achieve a continual improvement of the modeling accuracy and the scheduling performance. Such a repetitive cycle may be referred to as the online supervised learning or online training in this specification. As a result, the ANN models for the subsystems may be trained periodically by the online supervised learning. Alternatively, the steps 2 through 4 may be conducted once every several days and repeated continuously until the results are satisfactory. The thermal dissatisfaction may be used for an index representing a thermal satisfaction of the occupants, and it should be noted that any indicator that may represent the convenience or discomfort that the occupants feel during an operation of the HVAC system may be used for the thermal dissatisfaction. In an exemplary embodiment, the thermal dissatisfaction may be calculated by adding all the deviations of temperature ranges occurring to exceed the preset temperature level.

According to the method for controlling the thermal energy system of the building using the interconnected artificial neural network and the online supervised learning according to an embodiment of the present disclosure, it is possible to reduce the operation cost and maximize the thermal satisfaction of the occupants of the building based on the optimal control condition.

The algorithm and/or method according to an exemplary embodiment of the present disclosure may be formulated by Equations 1 through 8 below, for example, to optimally operate the HVAC unit 200 in the building. In addition, the constrained optimization problem using the Equations 1 through 8 may be converted into an unconstrained optimization problem represented by Equations 9 through 11 using a penalty method.

Original Problem for Optimal HVAC System Operation

An original problem involves performing operations of minimizing an objective function $J_1$ expressed by Equation 1.

$$J_1 = \sum_{t=1}^{N_T} C^t P^t \quad \text{[Equation 1]}$$

In the Equation 1, '$N_T$' denotes a scheduling time interval. In case that the scheduling is performed at an interval of one hour for a day, the value of NT is 24. '$C_t$' and '$P_t$' denote the hourly-varying retail electricity price and the input power of the HVAC unit 200. The Equation 1 expresses an electricity price for the power used by the HVAC unit 200 of the building during the time interval from 1 to $N_T$. It is noted that the electricity price can be negative, for example, when there is an excess of renewable generation. In this specification, the electricity price is regarded as the operation cost.

Meanwhile, the original optimization problem of minimizing the objective function expressed by the Equation 1 may involve constraints expressed by Equations 2 through 8.

Equation 2 expresses a first constraint indicating an operating range of a thermostat controller and limiting the input $T_{set}$ of the HVAC unit 200 to be set within a certain prescribed range from a minimum value $T_{set,min}$ to a maximum value $T_{set,max}$. The first constraint prohibits an unnecessarily small or large values to secure a reliable operation of the normal operation of the HVAC unit 200.

$$T_{set,min} \leq T_{set}^t \leq T_{set,max}, \forall t \quad \text{[Equation 2]}$$

Equation 3 expresses a second constraint indicating a range of the indoor temperature of the building, which is maintained within a certain prescribed range from a minimum value $T_{i,min}^t$ to a maximum value $T_{i,max}^t$. The second constraint ensures the thermal comfort of occupants. The indoor temperature of the building may be calculated through the third ANN sub-model L3 as shown in Equation 8.

$$T_{i,min}^t \leq T_i^t \leq T_{i,max}^t, \forall t \quad \text{[Equation 3]}$$

Third and fourth constraints are provided to control the HVAC unit 200 such that the power consumption $P^t$ of the HVAC unit 200 is maintained within a range specified by the manufacturer. In detail, the third constraint expressed by Equation 4 requires the power consumption $P^t$ of the HVAC unit 200 to be maintained within a range from a minimum value $P_{min}$ to a maximum value $P_{max}$. The fourth constraint expressed by Equation 5 specifies a limit on the upward and downward ramp rates of the power consumption $P^t$ for a time period $\Delta t$ of one hour. In the Equation, the power consumption $P^t$ at t=0 may be set to zero assuming that the HVAC system is turned off at night when the commercial building has low occupancy. The power consumption $P^t$ of the HVAC unit 200 may calculated through the first ANN sub-model L1 as shown in Equation 6.

$$P_{min} \leq P^t \leq P_{max}, \forall t \quad \text{[Equation 4]}$$

$$R_L \leq \frac{P^t - P^{t-\Delta t}}{\Delta t} \leq R_H, \forall t \quad \text{[Equation 5]}$$

Equations 6 through 8 show that the power consumption $P^t$ of the HVAC unit 200, the output cooling power $Q^t$, and the indoor temperature $T_i^T$ of the building may be calculated using the learned ANN sub-models.

$$P^t = L_1(T_{set}^t, \ldots, T_{set}^{t-L_{P1}+1}, P^{t-1}, \ldots, P^{t-L_{P1}}, T_i^{t-1}, \ldots, T_i^{t-L_{P1}}), \forall t \quad \text{[Equation 6]}$$

$$Q^t = L_2(P^t, \ldots, P^{t-L_{P2}+1}, T_x^t, \ldots, T_x^{t-L_{P2}+1}, T_e^t, \ldots, T_e^{t-L_{P2}1}), \forall t \quad \text{[Equation 7]}$$

$$T_i^t = L_3(Q^t, \ldots, Q^{t-L_{P3}+1}, E^t, \ldots, E^{t-L_{P3}+1}, T_i^{t-1}, \ldots, T_i^{t-L_{P3}}), \forall t \quad \text{[Equation 8]}$$

Equation 6, which is a parameterized functional representation of the first ANN sub-model L1, expresses that the first ANN sub-model L1 may receive the input $T_{set}$ of the HVAC unit 200, the indoor temperature $T_i$ of the previous time, and the power consumption of the HVAC unit 200 of the previous time and calculate the current power consumption $P^t$ of the HVAC unit 200. In this case, the first ANN sub-model L1 is trained using the LSTM, which is a type of the artificial neural networks, and receives time-series data including the current and time-delayed data as input. Accordingly, the input variables of the first ANN sub-model L1 include the current data and the time-delayed data. The length of the time series data input to the first ANN sub-model L1 may be set to $L_{P1}$.

Equation 7, which is a parameterized functional representation of the second ANN sub-model L2, expresses that the second ANN sub-model L2 may receive the power consumption of the HVAC unit 200, the ambient temperature $T_x$, and the evaporator-side air temperature $T_e$ and calculate the output cooling power $Q^t$ of the HVAC unit 200. In this case, the second ANN sub-model L2 may be trained using the LSTM and receives time-series data including the current and time-delayed data as input. Accordingly, the input variables of the second ANN sub-model L2 include the current data and the time-delayed data. The length of the time series data input to the second ANN sub-model L2 may be set to $L_{P2}$.

Equation 8, which is a parameterized functional representation of the third ANN sub-model L3, expresses that the third ANN sub-model L3 may receive the output cooling power $Q^t$ of the HVAC unit 200, the atmospheric environmental variables E, and the previous indoor temperature and calculate the current indoor temperature $T_i^t$ of the building. In this case, the third ANN sub-model L3 may be trained using the LSTM and receives time-series data including the current and time-delayed data as input. Accordingly, the input variables of the third ANN sub-model L3 include the current data and the time-delayed data. The length of the time series data input to the third ANN sub-model L3 may be set to $L_{P3}$.

The lengths of input data $L_{P1}$-$L_{P3}$ of the sub-models may be different from each other, and artificial neural networks of another kind may be employed in the sub-models.

Reformulated Problem of the Original Problem

The optimization problem with the constraints of the equations 1 through 8 may be converted into a problem without the constraints of equations 9 through 11 below to apply a gradient descent (GD) algorithm which is one of the algorithms suitable for solving an optimization problem using an artificial neural network model. By performing operations minimizing an objective function $J_2$ expressed by equation 9, it is possible to efficiently control the HVAC unit 200 while taking into account the thermal satisfaction of the occupants in the building and the operation cost of the HVAC unit 200.

$$J_2 = \sum_{t=1}^{N_T} \{\lambda_y (C^t P^t)^2 \cdot \text{sgn}(C^t P^t) + \lambda_k (k^t)^2 + \lambda_h (h^t)^T \cdot h^t\} \quad \text{[Equation 9]}$$

$$k^t = \begin{cases} u^t - u_{max} & \text{for } u^t > u_{max} \\ u_{min} - u^t & \text{for } u^t < u_{min}, \forall t \\ 0 & \text{otherwise} \end{cases} \quad \text{[Equation 10]}$$

$$h^t = \begin{cases} s^t - s^t_{max} & \text{for } s^t > s^t_{max} \\ s^t_{min} - s^t & \text{for } s^t < s^t_{min}, \forall t \\ 0 & \text{otherwise} \end{cases} \quad \text{[Equation 11]}$$

In the Equation 9, '$N_T$' denotes a scheduling time interval, and $\lambda_y$, $\lambda_k$, and $\lambda_h$ denote weighting coefficients of respective target terms.

The equation generally has three target terms. The first term may represent the operation cost of the HVAC unit 200. The second term may represent a penalty function for a case when the input value (i.e., $u^t$ in the Equations 9 and 10) of the HVAC unit 200 deviates from the first constraint represented by the Equation 2. The size of the penalty may be calculated by the Equation 10, where '$u_{min}$' denotes a minimum value and '$u_{max}$' denotes a maximum value in an allowable range. The third term may represent a penalty function for a case when the state variable (i.e., $s^t$ in the Equations 9 and 10) of the HVAC unit 200 deviates from the second through fourth constraints represented by the Equations 3 to 5. The size of this penalty may be calculated by the Equation 11, where '$s_{min}^t$' a minimum value and '$s_{max}^t$' denotes a maximum value in an allowable range.

In this case, the state variables of the HVAC unit 200 may include the temperature in the building, the output cooling power of the HVAC unit 200, the power consumption of the HVAC unit 200, and variations thereof.

In order to taking into account operational characteristics of the HVAC unit 200 in the actual commercial building, it may be assumed that the HVAC unit 200 may be stopped after working hours during which there is few occupants in the building and turned on again in the early morning before people gather into the building to do their works. Accordingly, the input power of the HVAC unit 200 during the time period when few occupant are present in the building may be set to zero according to a setting in the objective function. Such a time period may be determined in advance.

The optimization problem of the equations 8 through 11 may be actually applied to various building models. The input variables of each sub-model, however, may vary depending on the thermodynamic design of the building and the load characteristics of the HVAC unit 200. Since the equations 8 through 11 include a functional representation of the artificial neural network model, the algorithm and/or an optimization problem according to an aspect of the present disclosure may be solved using the gradient descent algorithm to derive an optimal schedule for the operation of the HVAC unit 200.

In addition, the accuracies of the artificial neural network models L1-L3 associated with the optimization problem of the equations 8 through 11 may be enhanced periodically through the online supervised learning, and the performance of the optimal schedule may be enhanced as the periodic model learning progresses.

Exemplary Operations

Figure 7:
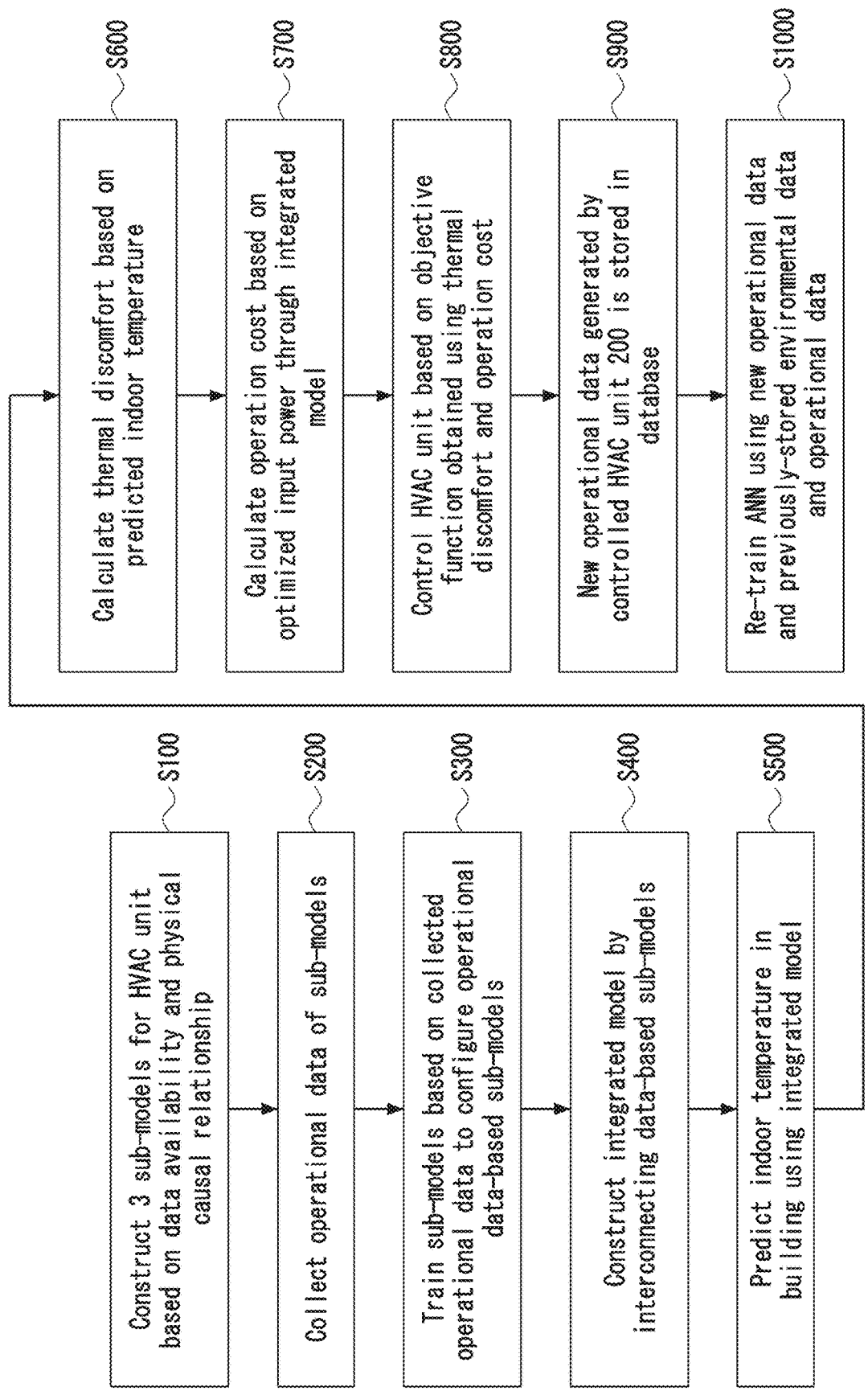
FIG. 7 is a flowchart of showing an operation method of the HVAC system according to an exemplary embodiment of the present disclosure.

FIG. 7 is a flowchart of showing an operation method of the HVAC system according to an exemplary embodiment of the present disclosure. In the drawing, operation method of the HVAC system is depicted by operations S100 through S1000.

In operation S100, a plurality of sub-models 3410-3430 for the HVAC unit 200 are constructed based on data availability and a physical causal relationship. In operation S200, the operational data of the configured sub-models 3410-3430 is collected.

In operation S300, the ANN training unit 330 trains the ANN sub-models 3410-3430 based on the collected operational data to configure operational data-based sub-models. The operation S300 may include operations S310-S330. In operation S310, the input power of the HVAC unit 200 in a current prediction section is calculated by inputting, to the first sub-model 3410, the indoor temperature of a previous prediction section and the input power of the HVAC unit 200 as the temperature set point and a feedback variable. In operation S320, the output cooling power is calculated by inputting, to the second sub-model 3420, the input power of the HVAC unit 200, the atmospheric temperature, and the evaporator-side air temperature. In operation S330, the indoor temperature of the current prediction section is calculated by inputting, to the third sub-model 3430, the output cooling power of the HVAC unit 200, the atmospheric environment variable, and the indoor temperature in the previous prediction section as the feedback variable.

In operation S400, an integrated model 340 is constructed by interconnecting the data-based sub-models 3410-3430.

In operation S500, the predictive controller 300 predicts the indoor temperature of the building using the integrated model 340. In other words, data including at least one of the external ambient temperature and the heat load of a zone in which each resident of the building is located is collected, and modeling the temperature change in the building may be performed according to the collected data in the operation S500.

In operation S600, the dissatisfaction calculator 400 may calculate thermal discomfort based on the predicted indoor temperature. The thermal discomfort is calculated by adding up all deviations from an acceptable range of indoor temperature exceeding a prescribed temperature.

In operation S700, the operation cost calculator 500 may calculate the operation cost based on the predicted input power through the integrated model 340.

In operation S800, the HVAC unit 200 is controlled based on the objective function obtained using the thermal discomfort calculated by the dissatisfaction calculator 400 and the operation cost calculated by the operation cost calculator 500. The objective function may be calculated by applying weights to the thermal discomfort calculated by the dissatisfaction calculator 400 and the operation cost calculated by the operation cost calculator 500. The HVAC unit 200 may be controlled such that the objective function is minimized.

In operation S900, the new operational data generated by the controlled HVAC unit 200 is stored in the second data storage 290.

In operation S1000, the ANN training unit 330 re-trains the ANN sub-models 3410-3430 using the new operational data stored in the second data storage 290 and the environmental data and the operational data stored in the first data storage unit 190 and the second data storage 290.

The operation method of the HVAC system using the interconnected artificial neural network and the online supervised learning according to an exemplary embodiment of the present disclosure may be implemented by using a recording medium storing program instructions and training data sets.

According to exemplary embodiments of the present disclosure, the thermal energy management system of a building may be controlled through a detection of an input power and a prediction of an indoor temperature using the HVAC system using interconnected artificial neural networks and the online supervised learning. Since the input and output of the HVAC system comprised of a number of complex facilities is predicted by a plurality of artificial neural networks provided for respective major components of the HVAC system rather than by a gigantic artificial neural network, the exemplary embodiments enable to check the prediction process of each of the artificial neural networks, require less training data sets, and show higher prediction accuracies.

The model accuracy may be enhanced by periodically re-training the individual artificial neural networks through the online supervised learning.

In addition, since the indoor temperature and the input power of the HVAC system is predicted by using an integrated model in which a plurality of models trained with the operational characteristics of the HVAC system and the thermal response or thermodynamics of the building are interconnected, the prediction accuracy is high and the operation cost may be reduced while maintaining the thermal satisfaction of the occupants of the building.

The apparatus and method according to exemplary embodiments of the present disclosure may be implemented by computer-readable program codes or instructions stored on a non-transitory computer-readable recording medium. The non-transitory computer-readable recording medium includes all types of recording media storing data readable by a non-transitory computer system. The computer-readable recording medium may be distributed over computer systems connected through a network so that a computer-readable program or code may be stored and executed in a distributed manner.

The non-transitory computer-readable recording medium may include a hardware device specially configured to store and execute program commands, such as ROM, RAM, and flash memory. The program commands may include not only machine language codes such as those produced by a compiler, but also high-level language codes executable by a computer using an interpreter or the like.

Some aspects of the present disclosure have been described above in the context of a device but may be described using a method corresponding thereto. In particular, blocks or the device corresponds to operations of the method or characteristics of the operations of the method. Similarly, aspects of the present disclosure described above in the context of a method may be described using blocks or items corresponding thereto or characteristics of a device corresponding thereto. Some or all of the operations of the method may be performed, for example, by (or using) a hardware device such as a microprocessor, a programmable computer or an electronic circuit. In some exemplary embodiments, at least one of most important operations of the method may be performed by such a device.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A heating, ventilation, and air conditioning (HVAC) system, comprising:
air conditioning sensor units installed in or outside a building to detect environmental data;
an HVAC device configured to supply thermal energy into an inner space of the building using input power;
a predictive controller configured to generate operational data based on the environmental data and control the HVAC device by adjusting the input power; and
an artificial neural network (ANN) training unit configured to perform operations of predicting indoor temperatures of the building by using an integrated model to generate predictive operational data,
wherein the integrated model comprises:
a first sub-model configured to receive a temperature set point, an indoor temperature of a previous time, and an input power of the HVAC device of the previous time to calculate a next input power of the HVAC device;
a second sub-model configured to receive input power of the HVAC device, an ambient temperature, and an evaporator-side air temperature to calculate an output cooling power of the HVAC device; and
a third sub-model configured to receive the output cooling power of the HVAC device, atmospheric environment variables, and the indoor temperature of the previous time to calculate an indoor temperature of the building,
wherein the predictive controller is configured to control the HVAC device by adjusting the input power to reduce a difference between the indoor temperature of the detected environmental data and the predicted indoor temperature.

2. The HVAC system of claim 1, further comprising:
a first data storage configured to store the environmental data including a heat load (Qi) of the building, an outside air temperature (Tx), an evaporator-side air temperature (Te), and a temperature, a humidity, a wind speed, and a solar radiation outside the building.

3. The HVAC system of claim 2, further comprising:
a second data storage configured to store operational data including a temperature setting (Tset), an input power (P), and an output cooling power (Q) of the HVAC device.

4. The HVAC system of claim 3, further comprising:
a training predictor configured to label unlabeled environmental data and operational data and train the predictive controller using labeled environmental data and labeled operational data.

5. The HVAC system of claim 4, wherein:
the ANN training unit is configured to periodically train the training predictor using interconnected artificial neural networks based on the environmental data stored in the first data storage and the operational data stored in the second data storage.

6. The HVAC system of claim 1, wherein each of the first through the third sub-models of the integrated model includes a LSTM network.

7. The HVAC system of claim 3, further comprising:
a preprocessor configured to normalize the environmental data from the first data storage and the operational data from the second data storage; and
a postprocessor configured to reconstruct the operational data generated by the integrated model.

8. The HVAC system of claim 1, further comprising:
a dissatisfaction calculator configured to calculate a thermal dissatisfaction of a user; and
an operation cost calculator configured to calculate an operation cost.

9. A method of operating a heating, ventilation, and air conditioning (HVAC) system comprising an HVAC device controlling humidity, ventilation, and air-conditioning of a building, the method comprising:
training an interconnected artificial neural network model for a data-based modeling of the HVAC device comprising a plurality of sub-models by use of initial operational data of the HVAC device;
operating the HVAC device according to an optimal schedule derived through the training and acquiring and storing environmental data and operational data;
re-training the plurality of sub-models by use of newly-collected environmental and operational data; and
predicting an input power of the HVAC device and an indoor temperature of the building according to an environmental change inside and outside the building by a trained artificial neural network model, calculating an operation cost and a thermal satisfaction, and determining a new optimal schedule for operating the HVAC device,
wherein training the interconnected artificial neural network model comprises:
calculating an input power of the HVAC device in a current prediction section by inputting, to a first sub-model, an indoor temperature of a previous prediction section and an input power of the HVAC device as a temperature set point and a feedback variable;
calculating an output cooling power by inputting, to a second sub-model, an input power of the HVAC device, an atmospheric temperature, and an evaporator-side air temperature; and
calculating an indoor temperature of the current prediction section by inputting, to a third sub-model, an output cooling power of the HVAC device, an atmospheric environment variable, and an indoor temperature in the previous prediction section as the feedback variable.

10. A method of operating a heating, ventilation, and air conditioning (HVAC) system controlling humidity, ventilation, and air-conditioning of a building, the method comprising:
constructing a plurality of sub-models for an HVAC device based on data availability and a physical causal relationship;
collecting operational data of the sub-models;
training the sub-models based on the operational data, by an ANN training unit, to configure operational data-based sub-models;
constructing an integrated model by interconnecting the data-based sub-models;
predicting, by a predictive controller, an indoor temperature of the building using the integrated model;
calculating, by a dissatisfaction calculator, thermal discomfort based on a predicted indoor temperature;
calculating, by an operation cost calculator, an operation cost based on a predicted input power provided by the integrated model;
controlling the HVAC device based on an objective function obtained using the thermal discomfort and the operation cost;
storing new operational data generated by the HVAC device in a second data storage; and
re-training the sub-models using the new operational data along with environmental data and the operational data,
wherein training the sub-models based on the operational data to configure operational data-based sub-models comprises:
calculating an input power of the HVAC device in a current prediction section by inputting, to a first sub-model, an indoor temperature of a previous prediction section and an input power of the HVAC device as a temperature set point and a feedback variable;
calculating an output cooling power by inputting, to a second sub-model, an input power of the HVAC device, an atmospheric temperature, and an evaporator-side air temperature; and
calculating an indoor temperature of the current prediction section by inputting, to a third sub-model, an output cooling power of the HVAC device, an atmospheric environment variable, and the indoor temperature in the previous prediction section as the feedback variable.

11. The method of claim 10, wherein the thermal discomfort is calculated by adding all deviations from an acceptable range of the indoor temperature exceeding a prescribed temperature.

12. The method of claim 10, wherein the objective function is calculated by applying respective weights to the thermal discomfort calculated by the dissatisfaction calculator and the operation cost calculated by the operation cost calculator.

13. The method of claim 10, wherein controlling the HVAC device based on the objective function comprises:
controlling the HVAC device such that the objective function is minimized.

14. The method of claim 10, wherein predicting the indoor temperature of the building using the integrated model comprises:
collecting data including at least one of an external ambient temperature and a heat load of a zone in which each resident of the building is located; and
modeling a temperature change in the building according to collected data.

* * * * *